R. G. COLLINS, Jr.
PNEUMATIC DESPATCH TUBE CARRIER.
APPLICATION FILED APR. 28, 1913.
1,080,538.
Patented Dec. 9, 1913.
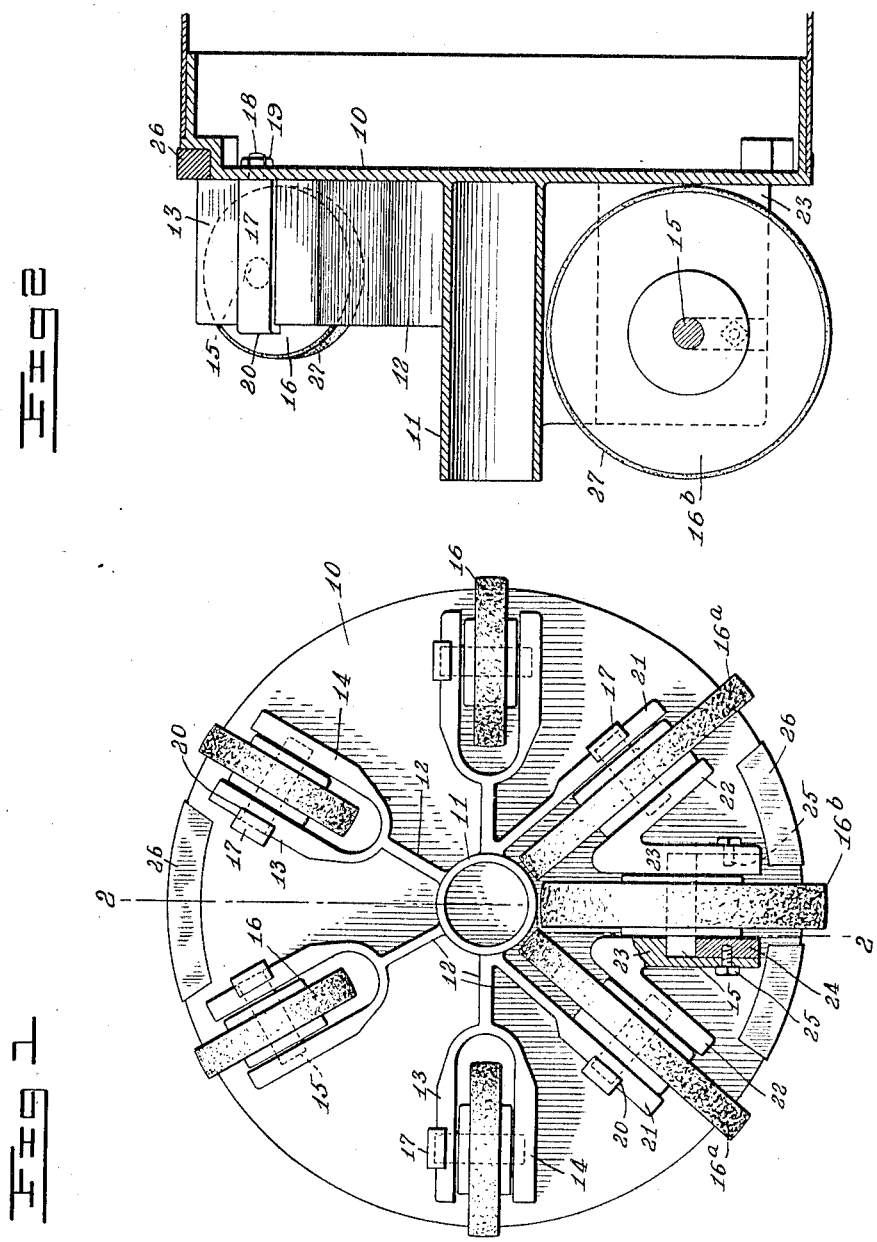
Inventor
Roderick G. Collins, Jr.
Witnesses
By Meyers, Cushman & Rea
Attorney

UNITED STATES PATENT OFFICE.

RODERICK G. COLLINS, JR., OF NEW YORK, N. Y.

PNEUMATIC-DESPATCH-TUBE CARRIER.

1,080,538.  Specification of Letters Patent.  Patented Dec. 9, 1913.

Application filed April 28, 1913. Serial No. 764,171.

*To all whom it may concern:*

Be it known that I, RODERICK G. COLLINS, Jr., a citizen of the United States, residing at New York, in the county of New York and State of New York, have invented new and useful Improvements in Pneumatic-Despatch-Tube Carriers, of which the following is a specification.

This invention relates to pneumatic despatch tube carriers, and has for its main object to provide means to hold the carrier centrally within the despatch tube and which maintains the carrier in upright position during its travel in the tube.

This invention, in the present instance, is shown in connection with the carrier head.

Other objects of the invention are: to provide the lower side of the carrier head with relatively large traveler-wheels to support the weight of the carrier: to provide improved supports or bearings for the wheel shafts: to provide the head with novel detachable devices for holding the shafts in their bearings: and to provide the carrier with friction surfaces at points where it comes into contact with the despatch tube and the operating parts in the tube.

With these objects in view the invention consists in the features hereinafter described and claimed, reference being made to the accompanying drawings showing one embodiment of the invention, wherein like parts are designated by similar characters of reference thoughout the several views, and in which—

Figure 1 is an elevation of the improved carrier head. Fig. 2 is a section on the line 2—2 of Fig. 1.

In the said drawings the reference numeral 10 designates the head of a carrier having an outwardly projecting and centrally located bumper 11 from about which radiate webs 12 integral with the head 10. The outer ends of the webs 12 are forked or bifurcated to provide bearings 13 and 14 for the traveler-wheel shafts 15. The bearings 13 are provided with shaft receiving openings extending transversely through the same while the bearings 14 are provided with recesses in their inner faces registering with the openings through the bearings 13. The shafts 15 are inserted through the bearings 13, through the hub of the traveler-wheels 16 and engage at their inner ends in the recesses in the bearings 14. For the purpose of holding each shaft 15 in position in the bearings, the head 10 carries a locking dog 17. The dog 17 comprises a shank having a reduced threaded portion 18 passing through the body of the head 10 and carrying a clamping nut 19 upon its inner end which nut binds against the inner side of the head 10 and holds the dog 17 in position. The shank of the dog extends from the head and bears against the outer end of the shaft 15, the dog 17 having a laterally extending lip 29 resting against the outer face of the bearing 13, as shown in Fig. 2. It is thus seen that the dog 17 holds the shaft 15 from accidental displacement by the vibration of the carrier, or the like.

In the head shown in the present embodiment seven traveler-wheels are used, the four upper ones being of the usual size and extending slightly beyond the edge of the head 10, while the three lower wheels $16^a$, $16^a$ and $16^b$ are nested together and are relatively large as compared with the upper wheels, and the middle or lowermost traveler-wheel $16^b$ is made relatively heavy so as to balance the carrier in upright position during its flight through the despatch tube. The webs 12 at the lower side of the head terminate at their outer ends in single flat bearings 21 having shaft receiving openings extending entirely therethrough. These lower webs 12 are widely spaced apart and the bearings 21 constitute the outer or end bearings for these three relatively large traction wheels. The wheels $16^a$ are mounted one each against the inner side of either of the bearings 21, and arranged against the inner or lower sides of the wheels $16^a$ are a pair of inverted V-shape webs integral with the head 10, the opposite flanges of which constitute bearings 22 and 23. The bearings 22 are provided at their outer faces with shaft receiving recesses registering with the openings through the opposed bearings 21. The shafts 15 which support the traveler-wheels $16^a$ extend through the bearings 21, through the hubs of the traveler-wheels $16^a$, and engage in their inner ends in the recesses in the bearings 22. The shafts 15 are held in the bearings 21 and 22 by the dogs 17 as above described.

Because of the nesting of the three lower traction wheels, it is found to be a practical difficulty to bore openings through the lower bearings 23, and to mount a wheel $16^b$ in position. The bearings 23 are slotted in their inner faces and from their lower ends inwardly. The shaft 15 supporting this central traction wheel 16<sup>b</sup> is inserted at its ends in said slots and moved upwardly into position. Filler plates or blocks 24 are secured in the lower ends of the slots by screws 25 or the like, and form at their upper ends lower bearing surfaces for the ends of the shaft 15. It will be noted that the three large traction traveler-wheels 16<sup>a</sup> and 16<sup>b</sup> are mounted so as to extend below the head 10 a greater distance than the upper traveler-wheels extend. The result of this arrangement is that the head 10 is elevated in the tube to a point concentric therewith thereby providing an equal spacing of the tube about the edge of the head 10 and overcoming the objection which is now common in having an opening or space between the tube and the head which is greater at the top.

At the extreme top of the head 10 there is shown in the drawings a friction block 26. This block 26 conforms to the contour of the edge of the head 10 and may be secured thereto in any suitable manner, such as shown. These friction blocks 26 are also located at the lower side of the carrier 10 and assist in balancing the carrier in the tube and hold it in upright position, and are disclosed as being positioned in the spaces in the head between the lower enlarged traction wheels. It is of course understood that the friction blocks or surfaces 26 may be positioned on the head 10 at any point desired, may extend throughout any desired length of the carrier, and any number of the same desired may be used. The special advantage of providing these friction-blocks or surfaces 26 may be appreciated with reference to the improved brake or stop mechanism for the carrier disclosed in the co-pending application filed of even date herewith, and wherein it is seen that the braking surfaces engage the friction-blocks so as to bring the carrier to a stand-still in the tube.

From the drawings it will be noted that the head is provided at each side with a horizontally disposed traveler wheel 16, as is usual, and the wheels at the lower side of the head are weighted to hold the carrier in upright position or from shifting during its flight through the tube so that these laterally and horizontally disposed traveler wheels are in position to act as a guide when the carrier strikes switches and horizontal curves in the despatch tube.

If it is desired the traveler wheels 16 may be provided with a tire or tread face 27 of any suitable material, such as a fabric, this tire reducing the wear between the tube and the traveler wheel which is found to be at times very considerable.

It is of course understood that various minor changes may be made in the details of construction of this carrier head, that a carrier head such as disclosed in the accompanying drawings and above described is located at each end of the carrier, and that the invention is not limited to this specific embodiment but only by the features brought out in the appended claims.

What is claimed is—

1. A pneumatic despatch tube carrier having a head, and a plurality of traveler-wheels mounted on the head, the lower of said wheels being enlarged and weighted whereby to center said carrier in the tube and maintain the carrier in upright position.

2. In a pneumatic despatch apparatus, a cylindrical carrier otherwise free to revolve in a transit tube, and a weight at one portion of the carrier to maintain that portion of the carrier lowermost.

3. In a pneumatic carrier, a head, and a plurality of traveler-wheels carried on the head, the lower wheels on the head being weighted whereby to maintain the carrier in upright position during its travel through the tube.

4. In a pneumatic despatch apparatus, a carrier adapted to travel in a tube of greater diameter than the carrier, and a plurality of wheels mounted on the carrier and projecting therefrom to support the carrier, the circle of projection of the wheels beyond the carrier being eccentric to the carrier an amount approximately equal to the difference between the radii of the tube and the carrier whereby to support the carrier substantially centrally within the tube.

5. In a pneumatic carrier, a head, a plurality of traveler-wheels mounted on the head, the wheels at the lower side of said head being enlarged and adapted to support the weight of the carrier.

6. In a pneumatic despatch tube carrier, a head, a plurality of traveler wheels mounted on the head, the wheels at the lower side of the head being enlarged and projecting beyond the edge of the head a greater distance than the upper wheels whereby to support the carrier and raise the same into the center of said tube, the lowermost of said wheels being weighted whereby to maintain the carrier in upright position during its travel through the tube.

In testimony whereof I have hereunto set my hand in presence of two subscribing witnesses.

RODERICK G. COLLINS, JR.

Witnesses:
GERTRUDE M. STUCKER,
C. H. FESLER.

Copies of this patent may be obtained for five cents each, by addressing the "Commissioner of Patents, Washington, D. C."